United States Patent [19]
Schmidt et al.

[11] Patent Number: 5,828,713
[45] Date of Patent: Oct. 27, 1998

[54] REPLACEMENT CORE SHROUD ASSEMBLY FOR A BOILING WATER REACTOR

[75] Inventors: William R. Schmidt, Alexandria, Va.; Sterling J. Weems, Chevy Chase, Md.

[73] Assignee: MPR Associates, Inc., Alexandria, Va.

[21] Appl. No.: 948,269

[22] Filed: Oct. 9, 1997

Related U.S. Application Data

[62] Division of Ser. No. 730,178, Oct. 15, 1996, Pat. No. 5,687,206.

[51] Int. Cl.$^6$ .................................................... G21C 19/02
[52] U.S. Cl. ............................ 376/260; 376/287; 376/302
[58] Field of Search ..................................... 376/260, 287, 376/302, 285, 303, 304, 337, 372; 29/890.031, 402.01, 402.03, 402.08

[56] References Cited

U.S. PATENT DOCUMENTS

| | | |
|---|---|---|
| T911,015 | 6/1973 | Garkisch et al. . |
| 2,929,236 | 3/1960 | Steward et al. . |
| 2,998,370 | 8/1961 | Gaunt et al. . |
| 3,011,962 | 12/1961 | Koch et al. . |
| 3,116,214 | 12/1963 | Greenstreet . |
| 3,129,836 | 4/1964 | Frevel . |
| 3,215,608 | 11/1965 | Guenther . |
| 3,445,971 | 5/1969 | Desmarchais et al. . |
| 3,627,634 | 12/1971 | Guenther et al. . |
| 3,719,555 | 3/1973 | Davis . |
| 3,720,581 | 3/1973 | Kaser . |
| 3,733,760 | 5/1973 | Koerner . |

(List continued on next page.)

FOREIGN PATENT DOCUMENTS

| | | |
|---|---|---|
| 2 107 382 | 4/1972 | France . |
| 1 958 152 | 11/1969 | Germany . |
| 2 024 630 | 5/1970 | Germany . |
| 23 61 416 | 12/1973 | Germany . |
| 26 43 011 | 9/1976 | Germany . |
| 257 958 A3 | 2/1986 | Germany . |
| 08-105990 | 4/1996 | Japan ...................................... 376/260 |
| 08-86896 | 4/1996 | Japan ...................................... 376/260 |
| 08-152495 | 6/1996 | Japan ...................................... 376/260 |
| 1 787 095 A3 | 10/1990 | U.S.S.R. . |
| 1 271 594 | 7/1970 | United Kingdom . |

OTHER PUBLICATIONS

J.S. Abel et al, "Applicability of Pipelocks as a Remedy for Intergranular Stress Corrosion Cracking in BWR's," Int. J. Pres. Ves. & Piping 25, pp. 25–46 (1986).

Consumers Power Company, "Report of Operation of Big Rock Point Nuclear Plant," Docket No. 50–155, Forty Pages (Nov. 30, 1964).

Consumers Power Company, "Report of Operation of Big Rock Point Nuclear Plant," Docket No. 50–155, Six Pages (Dec. 30, 1965).

(List continued on next page.)

*Primary Examiner*—Charles Jordan
*Assistant Examiner*—Matthew J. Lattig

[57] ABSTRACT

A method of replacing a boiling water reactor core shroud includes the steps of removing at least a portion of the existing core shroud from supporting structure in the reactor vessel, lowering a replacement shroud into the reactor vessel, positioning the replacement shroud on the supporting structure such that a bottom portion of the replacement shroud mates cooperatively with the supporting structure to limit lateral movement of the replacement shroud relative to the reactor vessel, and holding the replacement shroud assembly in place by applying axially compressive forces to the shroud in the direction of the supporting structure. If the existing core shroud is secured by welds, a parting cut is made to remove the shroud and the replacement shroud is held in place by securing a plurality of tie rods between sites on the replacement shroud and the supporting structure at a respective plurality of angularly spaced locations about the shroud periphery. Existing safe end assemblies welded to core spray supply piping in the reactor vessel are removed and replaced with new safe end assemblies carrying components which mechanically couple with core spray supply piping carried by the replacement core shroud.

14 Claims, 13 Drawing Sheets

U.S. PATENT DOCUMENTS

| | | |
|---|---|---|
| 3,744,660 | 7/1973 | Gaines et al. . |
| 3,785,924 | 1/1974 | Notari . |
| 3,850,795 | 11/1974 | Thome . |
| 3,910,447 | 10/1975 | Bevilacqua . |
| 3,926,722 | 12/1975 | Dupen . |
| 3,994,776 | 11/1976 | Keller . |
| 4,011,132 | 3/1977 | Kumpf et al. . |
| 4,053,080 | 10/1977 | Daublebsky . |
| 4,057,162 | 11/1977 | Gross . |
| 4,073,685 | 2/1978 | Brown et al. . |
| 4,092,215 | 5/1978 | Mutzl . |
| 4,111,327 | 9/1978 | Janakiev . |
| 4,135,974 | 1/1979 | Garkisch et al. . |
| 4,165,021 | 8/1979 | Dorling . |
| 4,192,718 | 3/1980 | Janakiev . |
| 4,199,403 | 4/1980 | Puri et al. . |
| 4,199,994 | 4/1980 | Beine et al. . |
| 4,223,797 | 9/1980 | Skakunov . |
| 4,265,010 | 5/1981 | Doss et al. . |
| 4,285,503 | 8/1981 | Calhoun et al. . |
| 4,299,658 | 11/1981 | Meuschke et al. . |
| 4,322,880 | 4/1982 | Lampe . |
| 4,379,119 | 4/1983 | Fujimoto . |
| 4,409,179 | 10/1983 | Burger . |
| 4,562,332 | 12/1985 | Walter et al. . |
| 4,572,548 | 2/1986 | Porowski et al. . |
| 4,575,129 | 3/1986 | Porowski . |
| 4,585,091 | 4/1986 | Budd . |
| 4,594,774 | 6/1986 | Barker et al. . |
| 4,596,689 | 6/1986 | Gorholt et al. . |
| 4,652,426 | 3/1987 | Boyle et al. . |
| 4,789,520 | 12/1988 | Morimoto et al. . |
| 4,991,280 | 2/1991 | Reimer et al. . |
| 5,257,295 | 10/1993 | Chevereau et al. . |
| 5,265,141 | 11/1993 | Kobsa . |
| 5,274,683 | 12/1993 | Broda et al. . |
| 5,319,692 | 6/1994 | Hopkins et al. . |
| 5,392,322 | 2/1995 | Whitling et al. . |
| 5,402,570 | 4/1995 | Weems et al. . |
| 5,430,779 | 7/1995 | Baversten et al. . |
| 5,502,754 | 3/1996 | Erbes . |
| 5,519,744 | 5/1996 | Relf . |
| 5,538,381 | 7/1996 | Erbes . |
| 5,577,082 | 11/1996 | Weems et al. . |
| 5,583,899 | 12/1996 | Relf . |
| 5,588,031 | 12/1996 | Bevilacqua et al. . |
| 5,600,687 | 2/1997 | Welsh . |
| 5,600,688 | 2/1997 | Jung . |
| 5,600,689 | 2/1997 | Weems et al. . |
| 5,600,690 | 2/1997 | Weems et al. . |
| 5,602,887 | 2/1997 | Jensen . |

OTHER PUBLICATIONS

Baltimore Gas and Electric, "Updates Final Safety Analysis Report — Calvert Cliffs Nuclear Power Plant," Forty–Five Pages (Jul. 20, 1982).

Illustrations of Haddam Neck Nuclear Plant, Figs. 5.3–4 and 04.2–10 (Mar. 1991 and Jun. 1994).

J.S. Abel et al, "Mechanical Methods of Improving Resistance to Stress Corrosion Cracking in BWR Piping Systems," Int. J. Pres. Ves. & Piping 34, pp. 17–29 (1988).

BWR Owner's Group, "Recommendations on Inservice Inspection of BWR Internal Components and Attachments," Presented to ASME Section XI Subcommittee on Nuclear Inservice Inspection, 29 pages (Apr. 1991).

J.E. Corr, "Big Rock Point Nuclear Plant Thermal Shield Instability, Part 1, Redesign and Test Programs," General Electric, San Jose, California, Seventy–Three Pages (Nov. 3, 1966).

Kewaunee Reactor Vessel Schematic, Fig. 3.2–21 and Fig. 4.2–2, Three Pages (Jul. 1, 1986).

Letter from Nuclear Regulatory Commission to Hatch dated Sep. 30, 1994, Thirteen Pages.

Hatch submittal to Nuclear Regulatory Commission dated Sep. 2, 1994, Nineteen Pages.

U.S. Nuclear Regulatory Commission, "Millstone Final Safety Analysis Report," Aug. 10, 1972, 54 Pages.

Handouts from NRC Meeting with Hatch/GE on Sep. 14, 1994, 211 Pages.

Illustration of Palo Verde Reactor Vertical Arrangement, Fig. 4.1–1, Mar. 1991, One Page.

Florida Power & Light Company, "Final Safety Analysis Report — vol. 1, St. Lucie Plant," Feb. 28, 1973, Eighty–four Pages.

Yankee Atomic Electric Company Yankee Rowe Proposal, Oct. 15, 1965, Twenty–Five Pages.

"Reactor Shroud Gets Braces," *Engineering News Record,* Feb. 7, 1994, p. 140.

REPLACEMENT CORE SHROUD ASSEMBLY FOR A BOILING WATER REACTOR

CROSS-REFERENCE TO RELATED APPLICATIONS

This application is a division of application Ser. No. 08/730,178, filed Oct. 15, 1996, now U.S. Pat. No. 5,687,206, which claims the benefit of U.S. Provisional application Ser. No. 60/013,498, filed Mar. 15, 1996.

BACKGROUND OF THE INVENTION

1. Field of the Invention

The present invention relates to boiling water reactors and, in particular, to a method of replacing a core shroud assembly in a boiling water reactor.

2. Discussion of the Related Art

Boiling water reactor shrouds are disposed concentrically within reactor vessels to divide the flow of coolant water through the reactor vessels and to structurally support and align the fuel assemblies, steam separator assemblies and control rod guide tubes. The shrouds are generally cylindrical and are typically formed of multiple arcuate steel plates joined by welds along their abutting vertical and horizontal edges. After periods of use, cracking of the shroud within heat affected zones of the welds tends to occur as a result of corrosion, radiation and stress. When excessive cracking of the horizontally oriented welds occurs, the shroud must either be replaced or repaired.

U.S. Pat. No. 5,402,570 to Weems et al, the disclosure of which is incorporated herein by reference, describes a method of repairing boiling water reactor core shrouds having horizontal cracks in heat affected zones of welds by securing plural tie rods in vertical orientation about the periphery of the cracked shroud to axially compress the shroud and thereby urge the opposing surfaces of the horizontal cracks toward one another. Lateral or radial spacers or bumpers may also be installed between the inner surface of the reactor vessel and the outer surface of the shroud and/or tie rods to resist horizontal seismic loads and to hold the shroud in place relative to the vessel wall in the event of cracking along any horizontal weld during a seismic event.

While the tie rod repair described in U.S. Pat. No. 5,402,570 provides an acceptable method for mitigating the consequences of such cracking, plant owners or regulatory agencies may find it desirable to forego repair of the core shroud and to replace the stainless steel portion of the shroud, which is particularly susceptible to intergranular stress corrosion cracking (IGSCC). In most cases, however, it is preferred that the tie rod repair be performed, either as a permanent repair or as an interim measure while preparing to replace the shroud.

SUMMARY OF THE INVENTION

Accordingly, it is a primary object of the present invention to provide a method of replacing a core shroud assembly in a boiling water reactor.

Another object of the present invention is to facilitate replacement of a core shroud assembly in a boiling water reactor by replacing all or part of the welded stainless steel portion of the reactor core shroud, which is particularly susceptible to intergranular stress corrosion cracking along heat-affected zones of welds, with a replacement core shroud which is mechanically coupled with supporting structure in the reactor vessel and held in place with tie rods and/or radial spacers.

A further object of the present invention is to provide new core spray supply piping as an integral part of a replacement shroud assembly and to install mechanical couplings in the reactor vessel in order to simplify connection of the core spray supply piping with safe end assemblies at the core spray nozzles when the replacement shroud assembly is installed.

Some of the advantages of the present invention are that the shroud replacement method can be accomplished remotely thereby minimizing exposure of personnel to potentially dangerous levels of radiation, that portions of an existing core shroud assembly susceptible to cracking can be removed and replaced with a replacement shroud assembly formed without welds or formed using improved welding and processing techniques that minimize the potential for cracking, that the replacement shroud assembly can be secured to existing structure in the reactor vessel using mechanical joints or couplings with interlocking features and tie-rods previously installed as part of a core shroud repair or specifically installed as part of the core shroud replacement, that welding of the replacement shroud assembly to existing shroud support structure is not required thereby minimizing reactor downtime and obviating the need for frequent inspections, that any number of circumferential welds between cylindrical sections of the replacement shroud assembly can be replaced with mechanical joints having interlocking features to provide alignment, sealing and the capability of carrying horizontal shear loads, and that handling, storage and shielding of the replacement shroud sections can be facilitated when more than one mechanical joint is used.

The present invention is generally characterized in a method of replacing a boiling water reactor core shroud including the steps of cutting at least a portion of the core shroud from supporting structure in the reactor vessel, removing from the reactor vessel the portion of the core shroud cut from the supporting structure, lowering a replacement shroud into the reactor vessel, positioning the replacement shroud on the supporting structure, and holding the replacement shroud in place by applying axially compressive forces to the shroud in the direction of the supporting structure. The new core shroud is preferably mechanically coupled with existing structure in the reactor vessel, such as the baffle plate and/or shroud support cylinder, and held in place with tie rods and/or radial support assemblies. The core shroud replacement method can be accomplished remotely using any type of tie rods and/or radial supports including, but not limited to, the tie rods and radial supports described in U.S. Pat. No. 5,402,570 to Weems et al.

Another aspect of the present invention is generally characterized in a method of replacing a boiling water reactor core shroud including the steps of removing at least a portion of the existing core shroud from supporting structure in the reactor vessel, lowering a replacement shroud into the reactor vessel, positioning the replacement shroud on the existing supporting structure such that a bottom portion of the replacement shroud mates cooperatively with the supporting structure to limit lateral movement of the replacement shroud relative to the reactor vessel, and holding the replacement shroud in place by applying axially compressive forces to the shroud in the direction of the existing supporting structure.

Yet another aspect of the present invention is generally characterized in a replacement core shroud assembly for a boiling water reactor having a reactor vessel and supporting structure disposed within the reactor vessel, the replacement core shroud assembly including at least a portion of a core shroud having a bottom portion configured to mate cooperatively with the supporting structure in the reactor vessel to limit lateral movement of the core shroud relative to the reactor vessel, and a plurality of tie rods secured between sites on the core shroud and the supporting structure at a respective plurality of angularly spaced locations about the periphery of the core shroud. In one embodiment, the bottom portion of the replacement core shroud fits against an upper portion of the supporting structure in telescoping relation with a seal preferably being disposed between the replacement core shroud and the supporting structure to assure an acceptable floodable volume. A core spray sparger is preferably disposed within the replacement core shroud, with core spray supply piping extending from the core spray sparger for mechanical connection with a replacement safe end assembly disposed at a core spray nozzle formed in the reactor vessel.

Other objects and advantages of the present invention will become apparent from the following description of the preferred embodiments taken with the accompanying drawings, wherein like parts in each of the several figures are identified by the same reference numerals.

DESCRIPTION OF THE PREFERRED EMBODIMENT

The method according to the present invention can be used to replace the core shroud of a boiling water reactor after tie rods and/or radial supports have been installed as part of a core shroud repair, in which case the new core shroud can be retained and supported by existing shroud support structures in the reactor and the tie rods which were previously installed as part of the core shroud repair. It is also possible to use the core shroud replacement method to replace core shrouds in which such repairs have not been undertaken.

Figure 1:
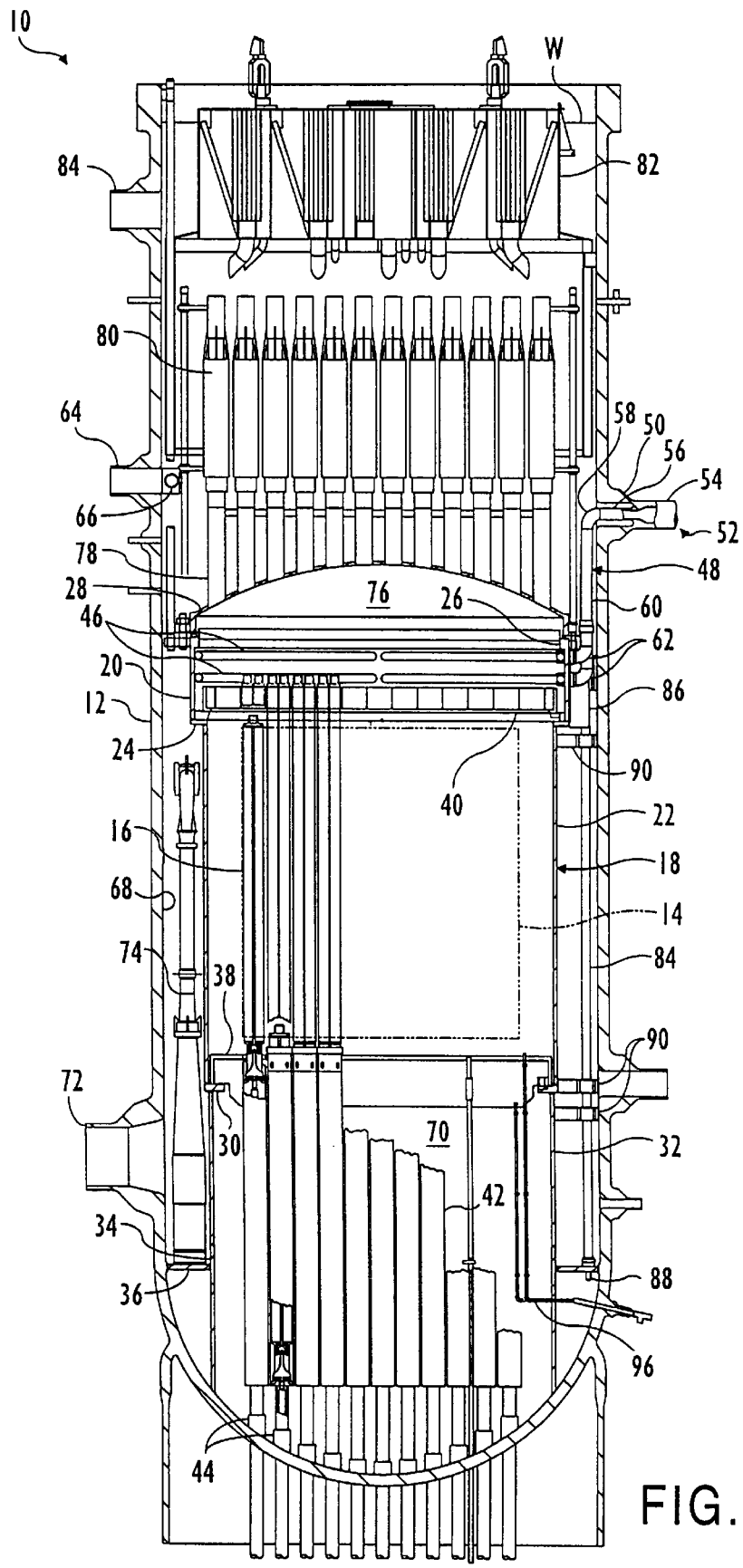
FIG. 1 is a side view, partly in section, of a boiling water reactor assembly with tie rods installed as part of a core shroud repair.

A boiling water nuclear reactor assembly 10 is illustrated in cut-away in FIG. 1. In view of the fact that the invention relates to replacing the reactor core shroud assembly and not to operation of the reactor itself, no attempt is made herein to provide a detailed description of reactor operation. Such operation is adequately described in numerous publications and patents, for example U.S. Pat. No. 3,627,634 to Guenther et al and U.S. Pat. No. 4,789,520 to Morimoto et al, among others.

Reactor assembly 10 includes a reactor vessel 12, a core 14 made up of a plurality of fuel assemblies 16, and a core shroud 18 disposed concentrically within the reactor vessel around the core. Core shroud 18 includes upper and lower cylindrical sections 20 and 22 connected by a horizontal top guide support ring 24 extending radially inward from a bottom edge of the upper cylindrical section to an upper edge of the lower cylindrical section. A shroud head flange 26 is welded to the upper edge of the shroud upper cylindrical section and extends radially inward to support a shroud head or lid 28 of generally hemispherical configuration, the lid being secured to the top of the shroud with bolts threadedly or otherwise engaged by lugs mounted in angularly spaced relation about the shroud periphery adjacent the upper edge of the shroud. A horizontal core plate support ring 30 extends radially inward from a bottom edge of the lower cylindrical shroud section to connect with and overhang the top of a cylindrical base 32 of smaller diameter than the lower cylindrical shroud section. The cylindrical sections of the shroud are typically made up of multiple arcuate Type 304 stainless steel plates having a thickness on the order of about one and one-half inches to about two inches with abutting vertical and horizontal edges of the plates being welded together. For purposes of convenience, the arcuate plates making up the different shroud sections are not individually illustrated in FIG. 1, it being noted that U.S. Pat. No. 5,402,570 to Weems et al provides an adequate description of the arcuate plates making up the different levels or sections of a typical shroud.

A lower end of the cylindrical base of shroud 18 is butt-welded to a shroud support cylinder 34 typically formed of inconel. A baffle plate or support structure 36 of ring-like configuration extends transversely from an outer surface of the shroud support cylinder to an inner surface of the reactor vessel where it is welded at an annular abutment location.

Fuel assemblies 16 are supported at the bottom by a core plate 38 mounted on the core plate support ring 30 and at the top by a top guide 40 mounted on the shroud head flange 26. Control rod guide tubes 42 are provided within vessel 12 at locations above a control rod driving mechanism extending through nozzles 44 located at the bottom of the vessel beneath the shroud. Lower ends of corresponding control rods are detachably connected to the driving mechanism and are arranged to move up and down within the guide tubes.

Tubular core spray spargers 46 of semicircular configuration are oriented horizontally within the upper cylindrical section of shroud 18 above top guide 40 and are apertured at multiple locations to supply water to the core. The semicircular core spray spargers are arranged in opposed pairs to form circular rings at two elevations, with core spray inlet or supply piping 48 connecting one pair of core spray spargers with a nozzle 50 formed in the reactor vessel above shroud 18, it being understood that similar piping can be used to connect the other pair of core spray spargers with a nozzle formed in the reactor vessel at a different azimuthal location. The connection at core spray nozzle 50 is made with a safe end assembly 52 having a hollow, cylindrical safe end 54 welded to the nozzle externally of the reactor vessel and a thermal sleeve 56 which extends inwardly, toward the interior of the reactor vessel, from the safe end to be disposed concentrically within the core spray nozzle with a small radial clearance therebetween. Core spray supply piping 48 extends inwardly, relative to the reactor vessel, from thermal sleeve 56 to a first 90° bend or elbow 58 where the piping turns downwardly to connect with a vertical section or downcomer 60. Vertical section 60 of the piping extends downwardly from the first elbow and divides into a pair of 90° bends or elbows 62 which turn inwardly at different elevations to connect with respective core spray spargers 46 inside the shroud.

Feedwater enters the reactor vessel via a feedwater inlet 64 and is distributed circumferentially within the reactor vessel by a ring-shaped pipe 66 disposed above the shroud and known as a feedwater sparger. The feedwater mixes with other water coming from the steam separators and flows downwardly from feedwater sparger 66 through the downcomer annulus 68, that is, the annular region between the reactor vessel and the core shroud, and ultimately enters the core lower plenum 70. A portion of the other downcomer water and feedwater is withdrawn from the reactor vessel via a recirculation water outlet 72 and is fed under pressure into a plurality of jet pump assemblies 74 distributed circumferentially about the core shroud to produce a forced convection flow through the core. Boiling is produced in the core creating a mixture of water and steam which enters the core upper plenum 76, that is, the space under the shroud sealing lid, and is directed into steam plenum heads or standpipes 78 mounted vertically on the shroud sealing lid in fluid communication with the core upper plenum. The mixture of water and steam flows through the standpipes 78 and enters a respective plurality of steam separators 80, which are shown as being of the axial-flow centrifugal type. The separated liquid water then mixes with incoming feedwater and flows downwardly to the core via the downcomer annulus. The steam, on the other hand, passes through a steam drying assembly or dryer 82 disposed above the steam separators and is withdrawn from the reactor vessel via a steam outlet 84.

As mentioned above, cracking of the core shroud within heat affected zones of the welds tends to occur over time as a result of corrosion, radiation and stress. When excessive cracking of the horizontally oriented welds occurs, the core shroud must either be replaced or repaired. In FIG. 1, plural tie rods 84 are shown secured in vertical orientation about the periphery of the shroud as part of a core shroud repair to axially compress the shroud and thereby urge the opposing surfaces of any horizontal cracks toward one another. Tie rods 84 are secured in vertical orientation to sites on shroud 18 adjacent the top and bottom of the shroud at a plurality of angularly spaced locations about the periphery of the shroud in the annular space between the shroud and the reactor vessel. An upper end of each tie rod 84 is secured to a metal beam or plate 86 installed between a respective pair of angularly spaced lugs (not shown) at the top of the shroud. Beam 86 can be secured to the shroud directly and/or to the lugs by any suitable means, such as, for example, use of slots, adhesives and/or screws. A hole or channel is defined vertically through the beam to receive the upper end of a tie rod, and the tie rod is axially tightened against a flange extending from the beam with a nut threadedly engaging the upper end of the rod. A lower end of each tie rod 84 terminates in a hook or similar engagement member 88 which is received in a hole or opening formed in support structure 36 and oriented to engage the bottom of the support structure. Radial or lateral spacers or bumpers 90 are installed between the inner surface of reactor vessel 12 and the outer surface of shroud 18 at a plurality of vertically spaced locations along the tie rods to resist horizontal seismic loads and to hold the shroud in place relative to the vessel in the event of cracking along any horizontal weld during a seismic event. Some examples of the types of tie rods that may be used to repair a core shroud are disclosed in U.S. Pat. No. 5,402,570 to Weems et al and U.S. patent application Ser. No. 08/358,085, filed Dec. 15, 1994, the disclosures of which are incorporated herein by reference.

Figure 2:
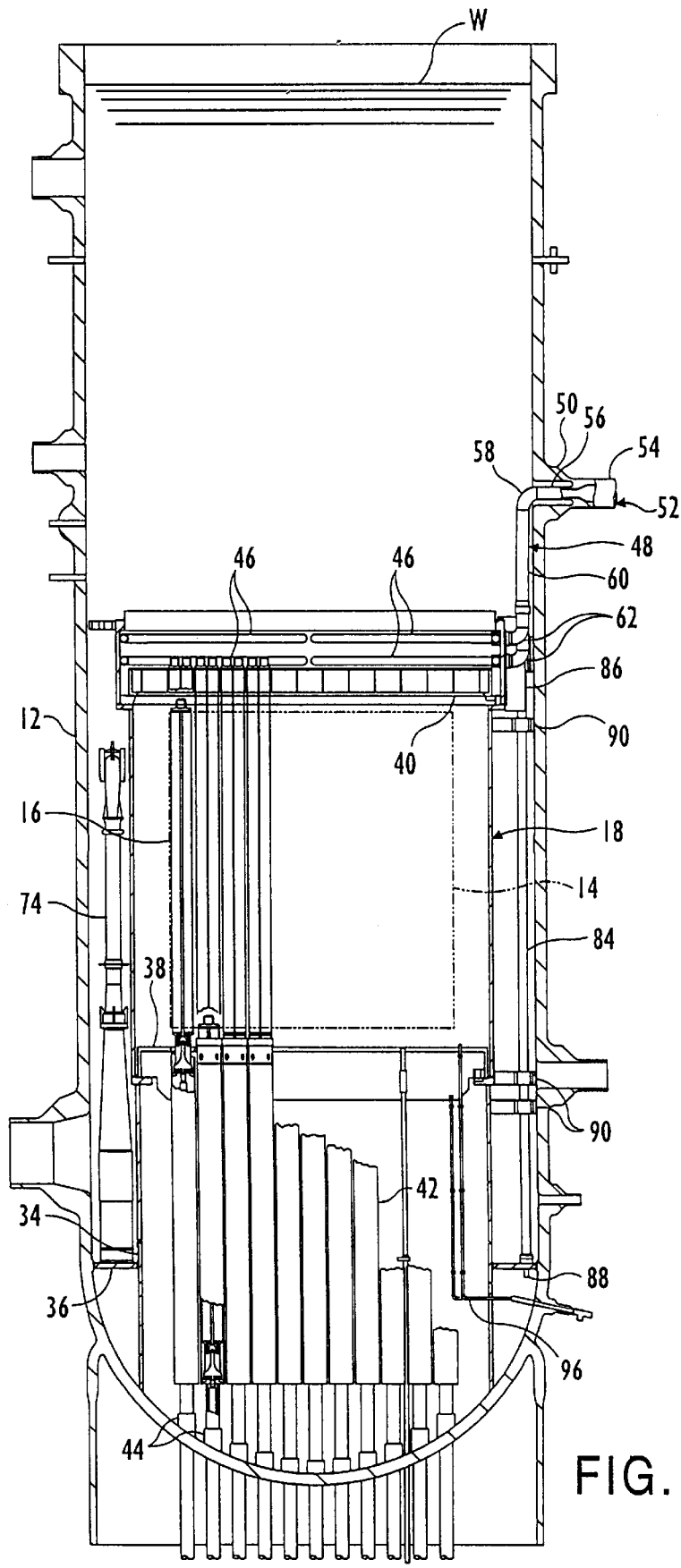
FIG. 2 is a side view, partly in section, of a boiling water reactor assembly with the shroud head, steam separator and dryer removed.
Figure 3:
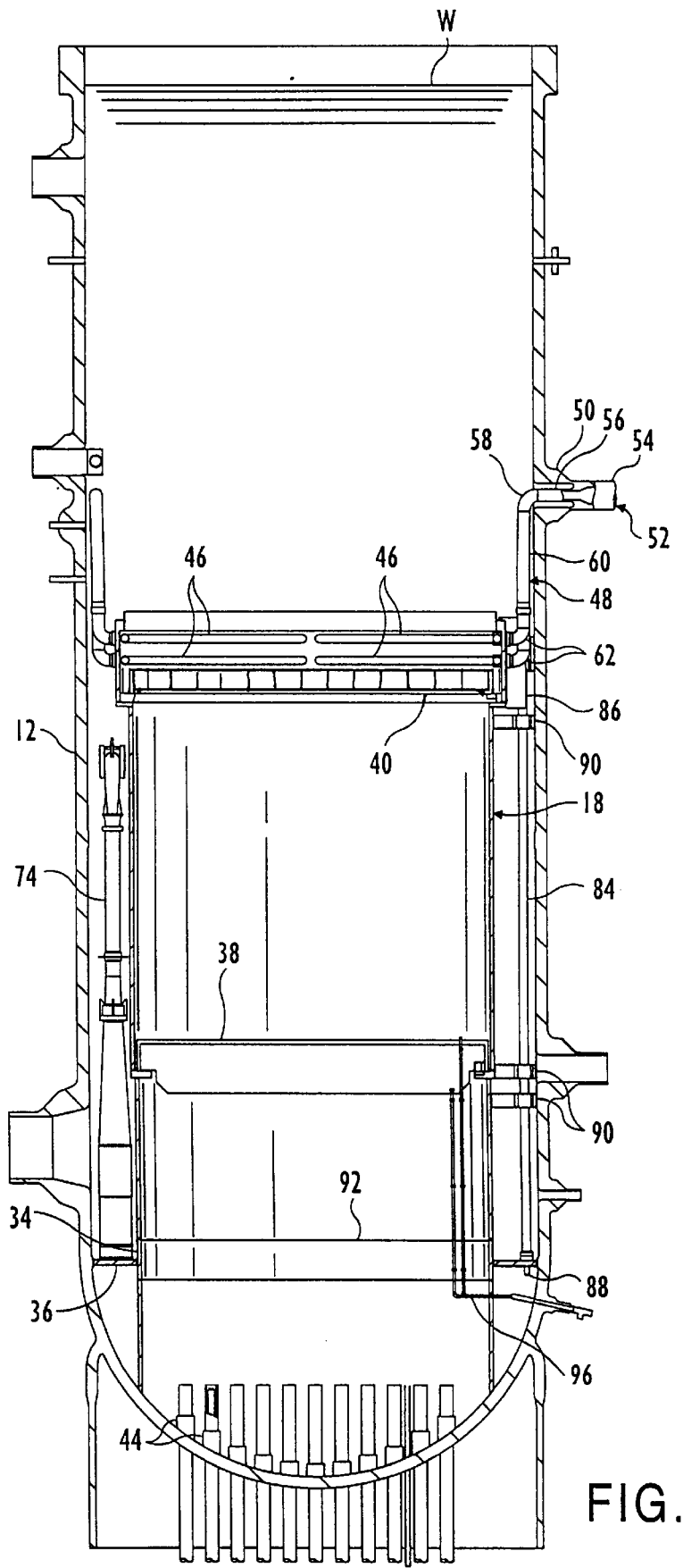
FIG. 3 is a side view, partly in section, of a boiling water reactor assembly with the fuel assemblies and control rod guide tubes removed.
Figure 4:
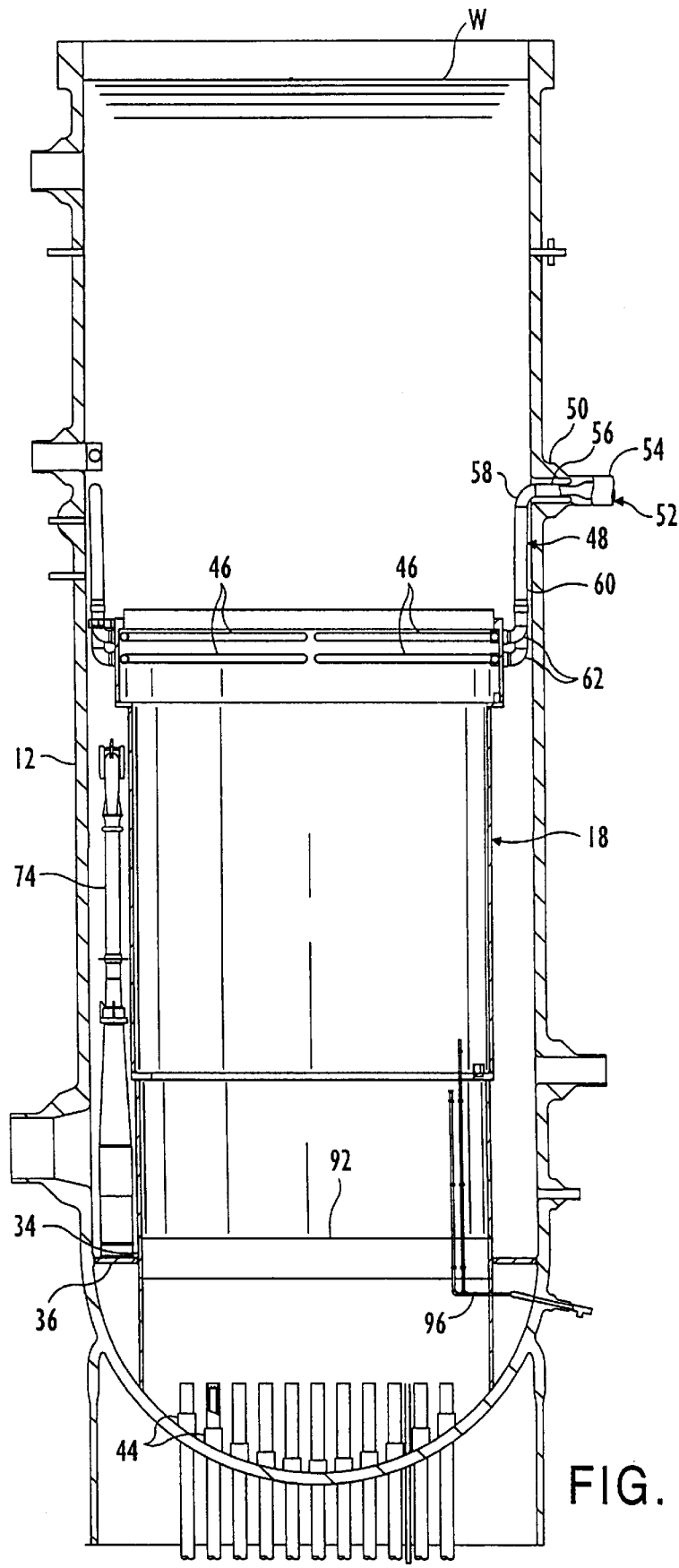
FIG. 4 is a side view, partly in section, of a boiling water reactor assembly with the core plate, tie rods, top guide and bumpers removed.

The tie rod repair described above permits safe reactor operation even with excessive cracking of horizontal welds; however, as mentioned previously, plant owners or regulatory agencies may at some point find it desirable or necessary to replace stainless steel portions of the core shroud 18. Referring to FIG. 2, a method of replacing a boiling water reactor core shroud according to the present invention includes shutting down the reactor and removing reactor internals such as the dryer 82, steam separator 80, and shroud head 28, etc., from reactor vessel 12 in the conventional manner, for example using long-handled tools operated from the refuel bridge above the reactor vessel to disengage any bolting and using the overhead crane to lift the internals out of the vessel and into a containment area such as an equipment pool disposed externally of the vessel. Fuel assemblies 16 and control rod drive guide tubes 42 are then removed from the reactor vessel as shown in FIG. 3, for example using the telescoping arm typically found on the refuel bridge, and are placed in a containment area such as a fuel pool disposed externally of the vessel. If required, the water level W is lowered so that measurements can be made to determine and document the as-installed configuration and alignment of the top guide 40 and core plate 38, for example, by measuring elevational, radial and azimuthal positioning of the top guide and core plate relative to the control rod drive nozzles 44 at the bottom of the reactor vessel. If desired, the top guide and core plate can be removed thereafter to facilitate measurement of vertical distances or elevation of features such as, for example, core spray nozzles 50, and the bimetallic weld 92 joining shroud 18 and shroud support cylinder 34. The measurements can be made using any suitable technique including, but not limited to, optical siting with a transit, laser techniques, jigs and mechanical fixtures. If tie rods 84 and/or radial supports or bumpers 90 have previously been installed to repair the core shroud 18, the tie rods and radial supports are removed as shown in FIG. 4, for example by performing the tie rod installation steps in reverse order, that is, by detensioning the tie rods, removing the nuts, brackets and any radial supports or spacers, disengaging the tie rods from their bottom attachments and lifting the tie rods from the reactor vessel using the overhead crane.

Figure 5:
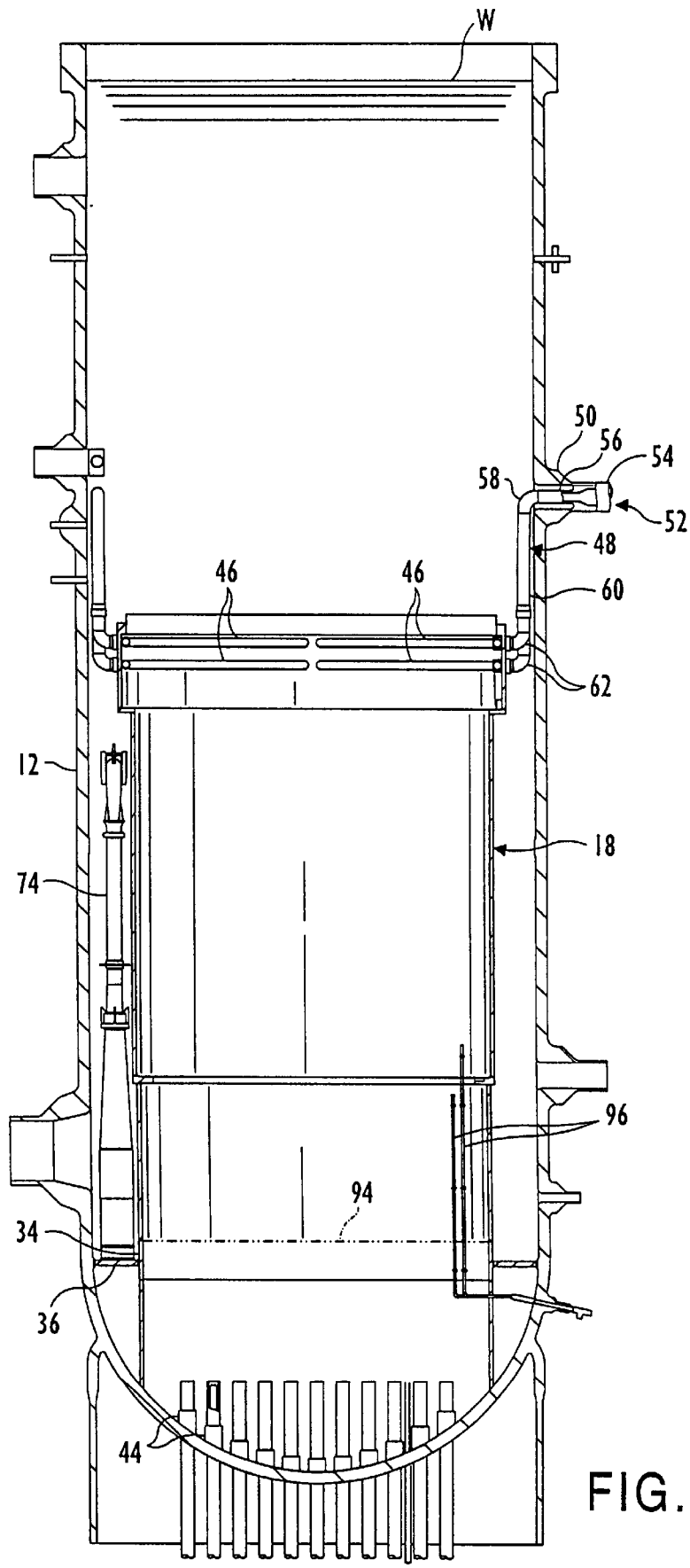
FIG. 5 is a side view, partly in section, of a boiling water reactor assembly showing the location of the bimetallic weld joint at which the shroud is cut according to one embodiment of the present invention.
Figure 6:
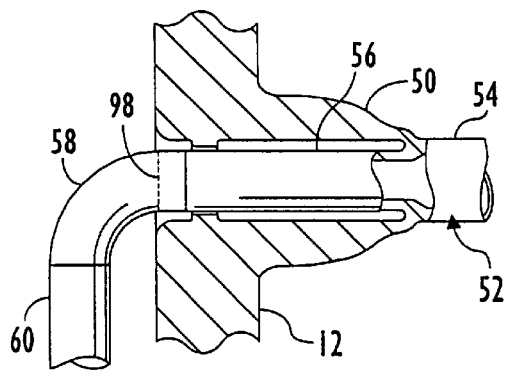
FIG. 6 is an enlarged fragmentary side view, partly in section, of existing core spray supply piping and a safe end assembly of the boiling water reactor assembly showing the location of a cut according to one embodiment of the present invention.

As indicated by broken line in FIG. 5, a full 360° parting or severance cut 94 is made in the inconel shroud support cylinder 34 above the baffle plate 36 and below the core plate elevation at or below the bimetallic weld 92, that is, at or below the transition weld between the stainless steel portion of the shroud and the inconel shroud support cylinder. The cut can be made using conventional cutting devices for reactor underwater service including, but not limited to, abrasive saws, milling tools, EDM devices or by creating a rough cut (e.g., with an air-arc cutter) followed by more precise machining (e.g., with a milling tool or abrasive cutter). The cutting device can be lowered through existing or created openings in the core plate and/or top guide, which can also be used to support the device if desired. Alternatively, the core plate and/or top guide can be removed prior to lowering the cutting device. The cut is preferably oriented horizontally and extends about the entire circumference of the shroud support cylinder to sever the stainless steel portion of the shroud from the shroud support cylinder. At this point, level sensing line supports 96 are cut at the shroud and core spray inlet piping 48 is cut at each of the inlet nozzle thermal sleeves, for example flush with the inside surface of the reactor vessel as shown by broken line in FIG. 6 at 98, as well as at other locations as required to facilitate removal of the shroud assembly from the reactor.

Figure 7:
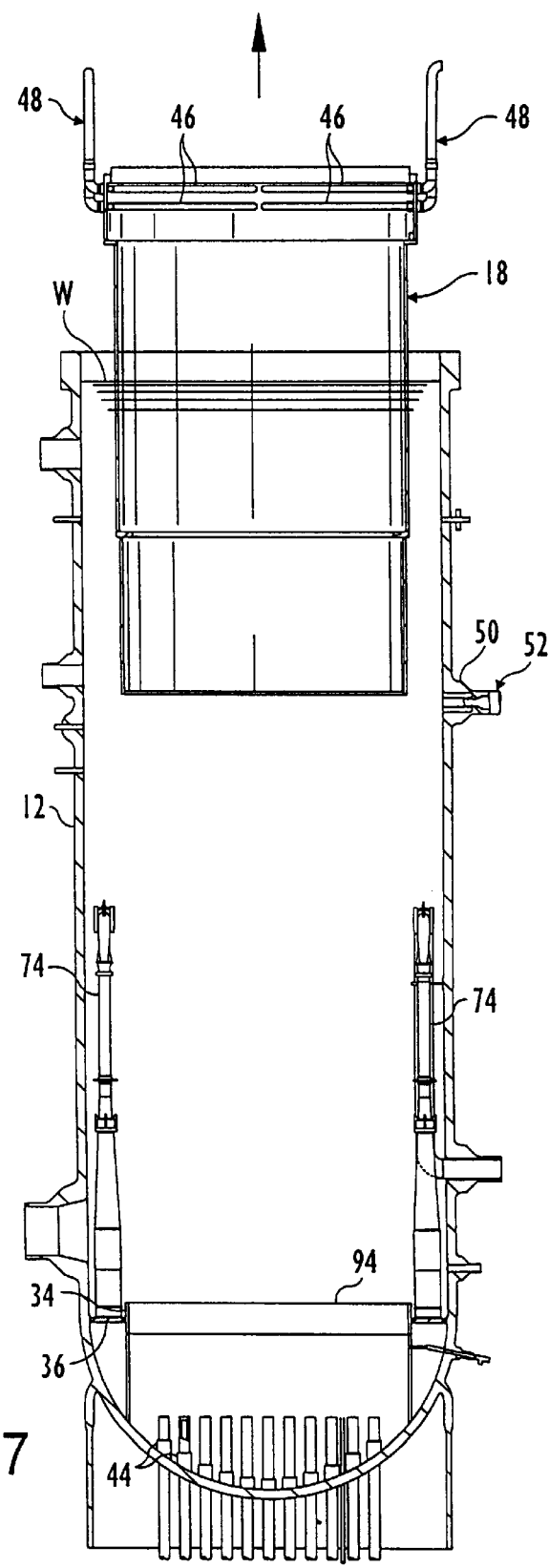
FIG. 7 is a side view, partly in section, of a boiling water reactor assembly illustrating removal of the stainless steel portion of the shroud and core spray piping from the reactor vessel.

The existing shroud assembly, including the core shroud 18 and core spray inlet piping 48, is then removed from the reactor as shown in FIG. 7 by lifting the shroud assembly vertically upward through the open top of the reactor vessel, for example using existing lifting points on the core shroud and the overhead crane of the reactor. If necessary, new lifting points can be established on the core shroud, for example by welding blocks onto the exterior surface of the shroud.

The foregoing steps need not be performed in the order in which they were presented and it will be appreciated that other structures, such as the feedwater spargers or jet pump support brackets, may also have to be removed to provide clearance and/or to minimize radiation levels before removing the existing shroud assembly. Also, the existing shroud assembly can be cut into multiple pieces which are removed from the reactor vessel separately, if desired, to improve handling and allow the use of shielded containers to provide increased protection for radiation.

Figure 8:
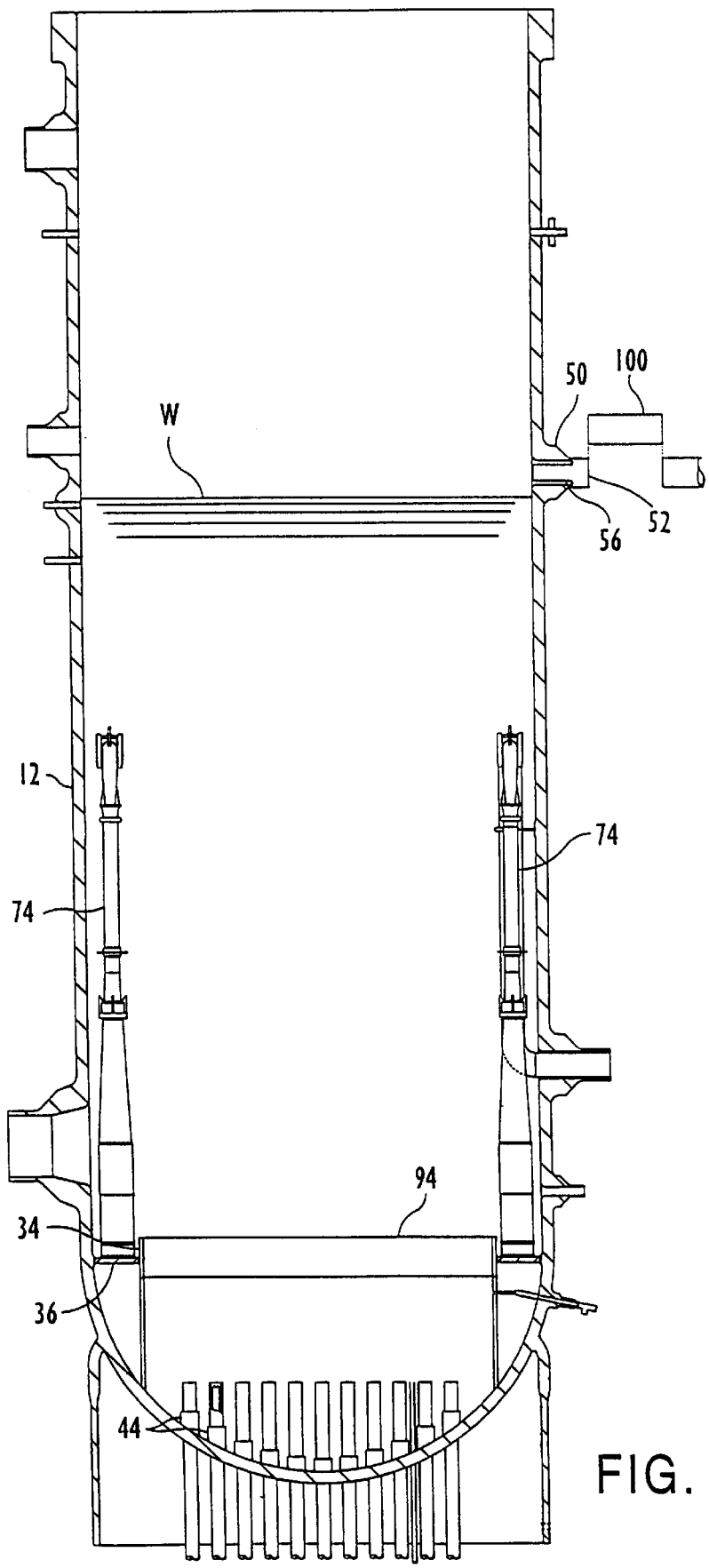
FIG. 8 is a side view, partly in section, of a boiling water reactor assembly illustrating core spray piping cut outside the reactor vessel to allow removal of the safe end assembly.

When the existing shroud assembly has been removed, the water level W in the reactor vessel is lowered to just below the core spray nozzles 50, as shown in FIG. 8, so that the existing core spray nozzle safe ends 52, including the thermal sleeve attachment, can be cut off and removed together with the remaining portions of the thermal sleeve from outside the reactor vessel. To this end, a short section or spool piece 100 of core spray piping may have to be removed outside the reactor vessel to provide clearance and necessary access/pull space when withdrawing the thermal sleeve 56 from the reactor vessel via the core spray nozzle. The spool piece is preferably of equal or greater length than the larger of the existing piece being removed and the replacement piece.

Figure 10:
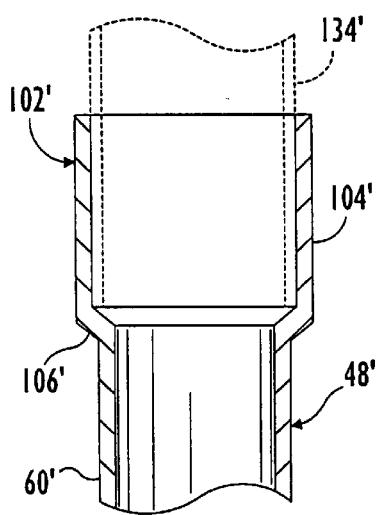
FIG. 10 is an enlarged fragmentary sectional side view of a fit-up piece for the core spray supply piping of the replacement shroud assembly.
Figure 9:
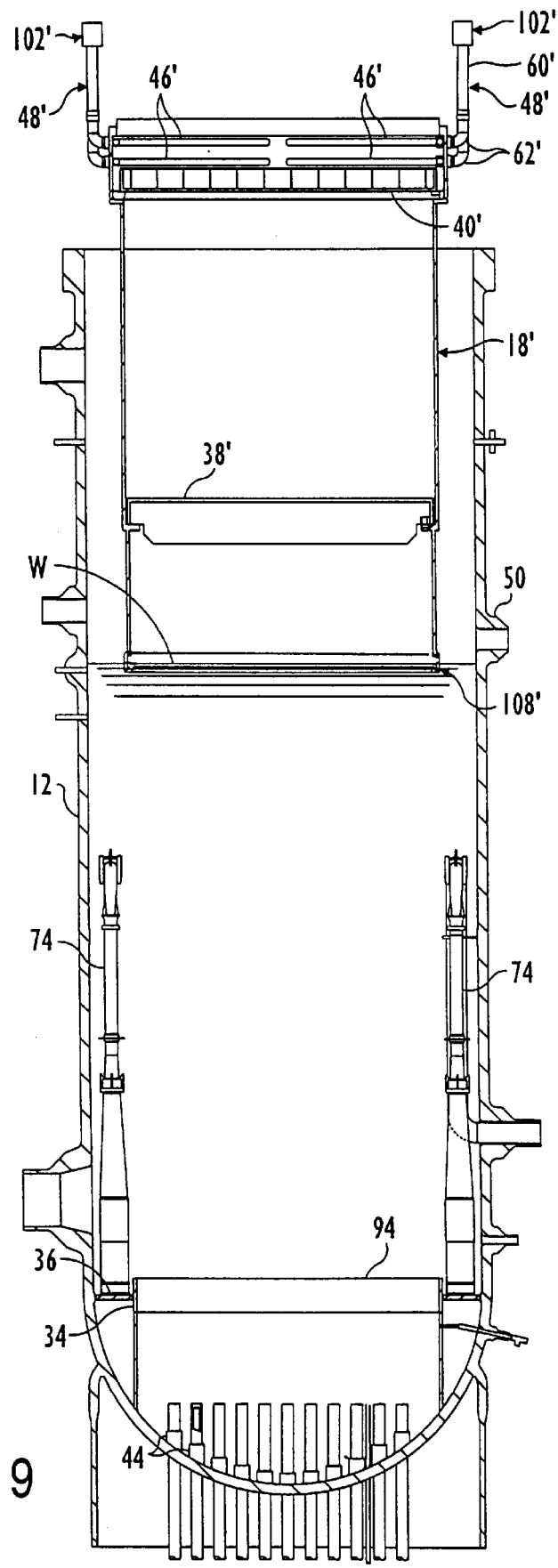
FIG. 9 is a side view, partly in section, of a replacement shroud assembly being lowered into the reactor vessel.

A replacement shroud assembly is preferably lowered into the reactor vessel before installation of new safe end assemblies; however, dependent upon reactor design, it may be preferable in some plants to install the new safe end assemblies and perform any necessary cleanup prior to lowering the replacement shroud assembly into the reactor vessel. Referring to FIG. 9, the replacement shroud assembly preferably includes a core shroud 18', a core plate 38', a top guide 40', core spray spargers 46' and core spray inlet or supply piping 48' which extends upwardly, looking at FIG. 9, from elbows 62' on each side of the shroud to a vertically oriented downcomer 60' which terminates at a fit-up piece 102'. As best seen in FIG. 10, fit-up piece 102' includes a hollow cylindrical portion 104' with an inner diameter of larger dimension than the inner diameter of the piping and a hollow frustoconical portion 106' of decreasing diameter in the downward direction, looking at FIG. 10, connecting a bottom edge of the cylindrical portion with the piping.

Figures 11, 12:
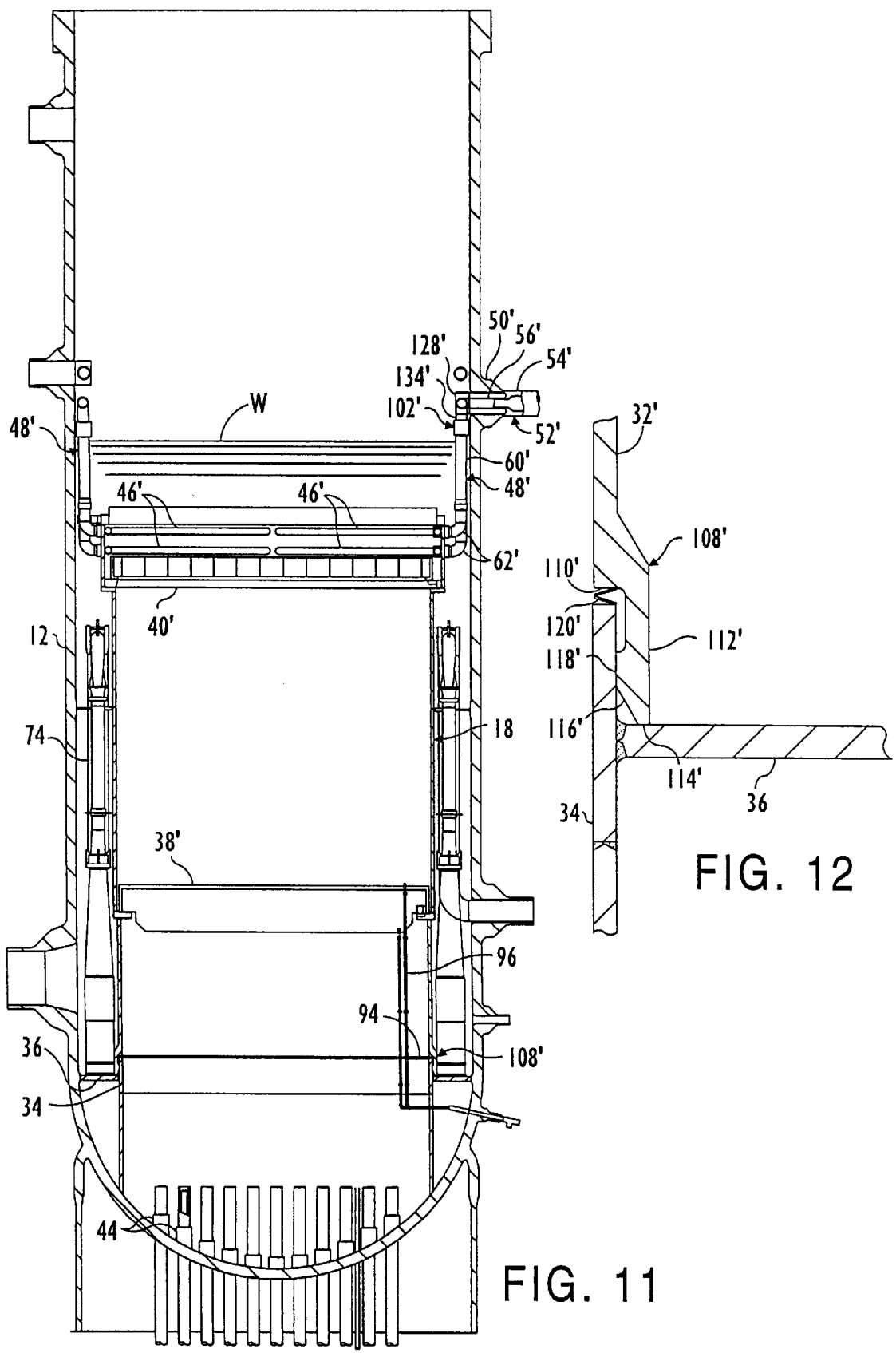
FIG. 11 is a side view, partly in section, of a boiling water reactor assembly illustrating placement of the replacement shroud assembly on existing shroud support structures and the mechanical coupling of the core spray piping with replacement safe end assemblies according to the present invention.
FIG. 12 is an enlarged fragmentary sectional side view illustrating the mechanical joint at the junction of the replacement shroud and existing shroud support structures.

A bottom portion of replacement shroud 18' includes a mechanical support or coupling 108' configured to mate cooperatively with the shroud support cylinder in telescoping relation when the shroud assembly is lowered onto the existing shroud support structure as shown in FIG. 11. Coupling 108' engages the shroud support cylinder in an interlocking manner to define a mechanical joint providing lateral support for the shroud without the need for a welded joint and, as best seen in FIG. 12, the coupling includes a radial step or shoulder 110' extending outwardly from the lower cylindrical section of the shroud to a generally cylindrical skirt 112' of greater diameter than the lower cylindrical section. Skirt 112' extends downwardly from shoulder 110' in radially spaced or abutting relation to the shroud support cylinder and terminates at a bottom 114' resting on baffle plate 36 for vertical support. Bottom 114' of the replacement shroud is chamfered at 116' to assist in positioning the shroud and to clear a fillet weld joining baffle plate 36 with shroud support cylinder 34, and a pad 118' is shown extending inwardly from the skirt adjacent the chamfer and in the direction of the shroud support cylinder to provide for field adjustment of the shroud position based on as-built dimensions measured prior to removing the original core shroud.

With skirt 112' resting on baffle plate 36, step 110' is disposed above the upper end of shroud support cylinder 34 to define a slight vertical gap or clearance therebetween. One or more suitable mechanical seals, for example Bellville washers 120', are disposed in the vertical gap or clearance between the radial step at the lower end of shroud 18' and the upper end of shroud support cylinder 34 so that the new shroud is sufficiently leak tight and able to provide an acceptable floodable volume for the reactor.

Figure 13:
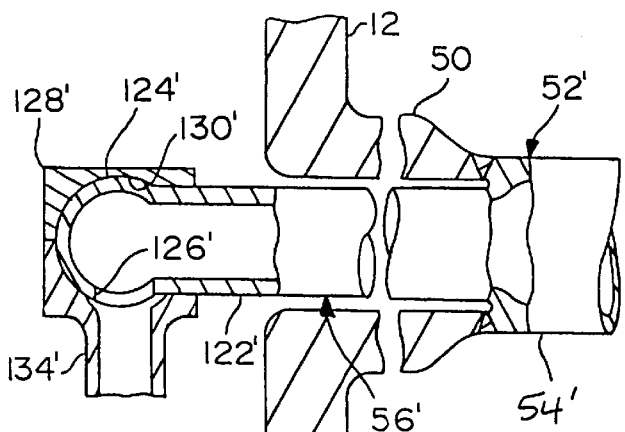
FIGS. 13 and 14 are a side view, partly in section, and an end view, respectively, illustrating a replacement safe end assembly including a thermal sleeve and a junction box for connecting the sleeve with core spray supply piping according to the present invention.
Figure 14:
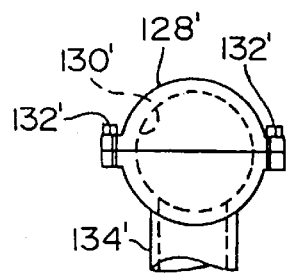

When top guide 40' and core plate 38' of the replacement core shroud assembly are aligned with control rod drive nozzles 44 in the reactor vessel lower head, new safe end assemblies are positioned in core spray nozzles 50, welded in place and any required non-destructive evaluation (NDE) is performed. A first embodiment of a replacement safe end assembly 52' is shown in FIGS. 13 and 14. The replacement safe end assembly 52' includes a hollow, cylindrical safe end 54' disposed externally of the core spray nozzle 50 and a thermal sleeve 56' which extends through the core spray nozzle with a small radial clearance. Thermal sleeve 56' includes a hollow, tubular portion 122' extending inwardly, toward the interior of the reactor vessel, from safe end 54' to a hollow, spherical protuberance or male connector 124' with a lateral opening 126' formed therethrough. A junction box or female connector 128' is generally cylindrical and includes a spherical cavity or recess 130' therein for receiving protuberance 124' of the thermal sleeve to form a ball joint. The junction box can be formed in two parts and held together with bolts or screws 132' as shown or formed in any other suitable manner to receive thermal sleeve 56' in sealing relation. A lower end of junction box 128' includes a tubular extension or downcomer 134' which extends downwardly from the junction box, looking at FIGS. 13 and 14, to mechanically couple with fit-up piece 102' at the upper end of the new core spray inlet or supply piping 48' as shown by broken lines in FIG. 10. The downcomer 134' is shown telescopically received within the cylindrical portion of the fit-up piece in sealing relation and is preferably able to move vertically and rock somewhat to allow for differential movement between the shroud and the reactor vessel and to accommodate assembly tolerances. Downcomer 134' can be coupled with fit-up piece 102' prior to, during or after installation of the new safe end assemblies dependent upon the design of the particular reactor and the possibility of structural interferences between components of the new safe end assemblies and the core spray supply piping.

Figure 15:
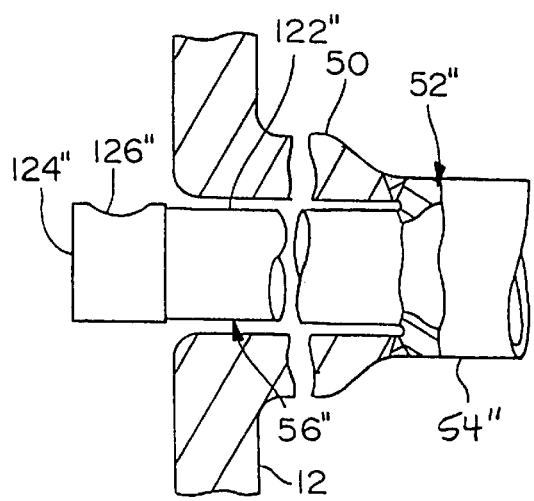
FIG. 15 is a side view, partly in section, illustrating another replacement safe end assembly according to the present invention.
Figure 16:
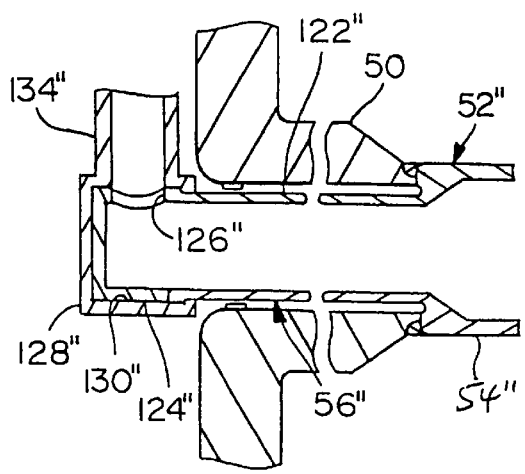
FIGS. 16 and 17 are a side view, partly in section, and an end view, respectively, illustrating the replacement safe end assembly of FIG. 15 coupled with another junction box according to the present invention.
Figure 17:
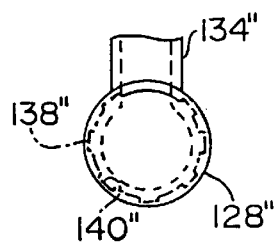

FIGS. 15–17 show another safe end assembly 52" according to the present invention which is similar to safe end assembly 52' but with a thermal sleeve 56" having a hollow, cylindrical protuberance or male connector 124" at a terminal or inboard end with a lateral opening 126" formed therein. In FIGS. 16 and 17, a junction box or female connector 128" is shown which includes a cylindrical recess or cavity 130" for receiving the cylindrical protuberance of thermal sleeve 56' in the manner of a bayonet connection, and a tubular extension 134" extends transversely from the junction box to communicate the opening 126" with the new core spray inlet piping. The tubular extension 134" and opening 126" are shown oriented in an upward direction in FIGS. 16 and 17 but can be oriented downward or have any other orientation dependent upon the positioning of the core spray inlet piping relative to the core spray nozzle. The bayonet connection for junction box 128" is shown with circumferentially spaced cut-outs or grooves 140" formed about the periphery of an opening in the junction box to receive complementary shaped protrusions or projections 138" extending radially outward of the cylindrical protuberance 124' to hold the sleeve in place within the junction box when the box is rotated about the longitudinal axis of the sleeve.

While specific thermal sleeves and junction boxes have been shown for connecting with the core spray supply piping, it will be appreciated that the core shroud assembly and method according to the present invention may include various other types of compliant joints, couplings or connections to accommodate rotational and axial fit-up tolerances and differential motions between the shroud and the vessel.

Figure 18:
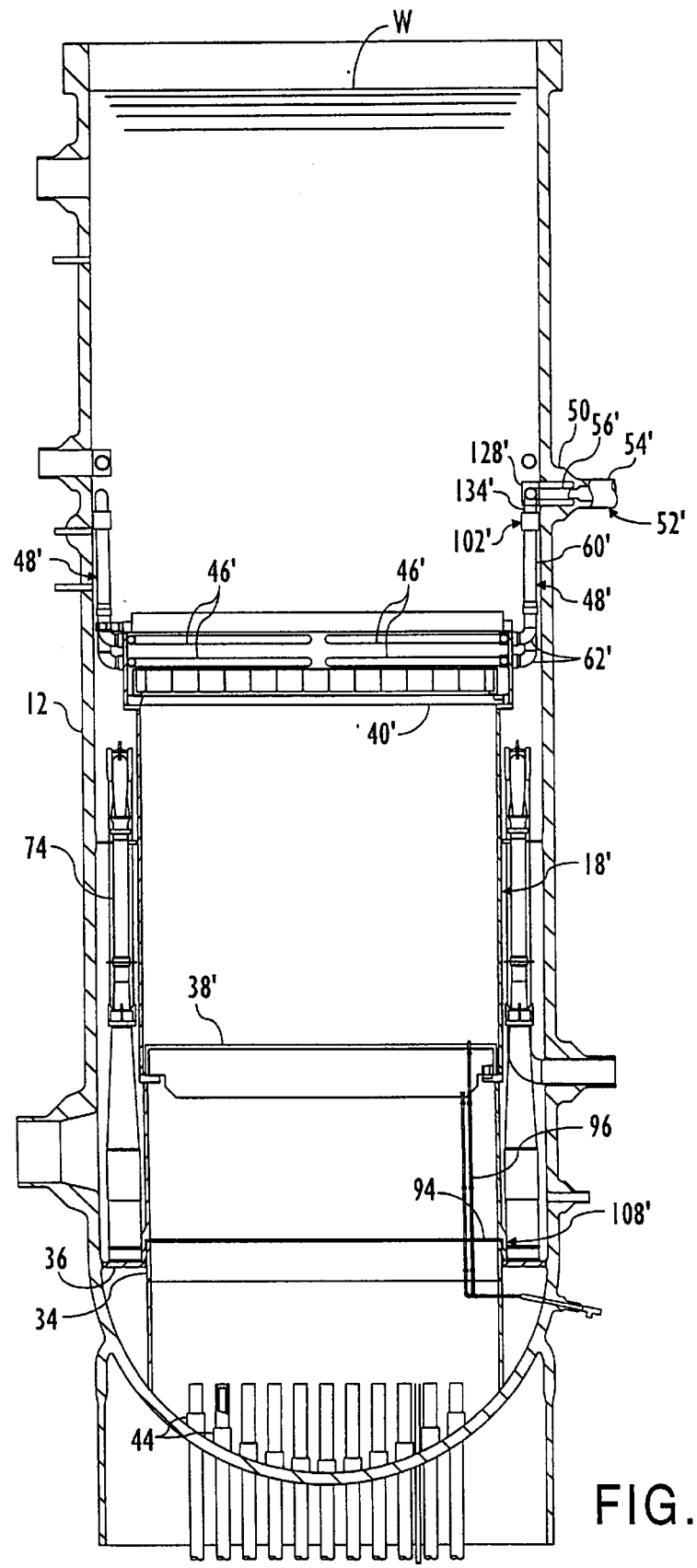
FIG. 18 is a side view, partly in section, of a boiling water reactor assembly illustrating an increase in the water level in the reactor vessel in preparation for reinstallation of the tie rods.

The new core spray supply piping is preferably an integral part of the replacement shroud assembly and is positioned (based on field measurements) to mate with the two thermal sleeve junction boxes described above. The piping and junction boxes are preferably mechanically sealed to limit leakage to an acceptable amount when the core spray system is actuated. Appropriate features are also included in the replacement shroud assembly to guide and support the in-core housings and water level measurement instrumentation. Adjustments in the mechanical fit-up of the piping components at the mating connections can be made once the shroud assembly has been lowered into the reactor vessel to assure an acceptable fit. Fit-up of the existing in-core housings and vessel water level sensor lines can also be made at this time using remote means or divers, as appropriate. The new core plate design preferably includes suitable lead-ins to facilitate re-insertion of in-core housings. Once the foregoing steps have been completed, the reactor water level W may be restored to a level near or above the reactor vessel flange elevation as shown in FIG. 18, that is, if the water level has not already been increased at an earlier stage in the replacement procedure, for example due to radiation levels encountered for a particular reactor.

Figure 19:
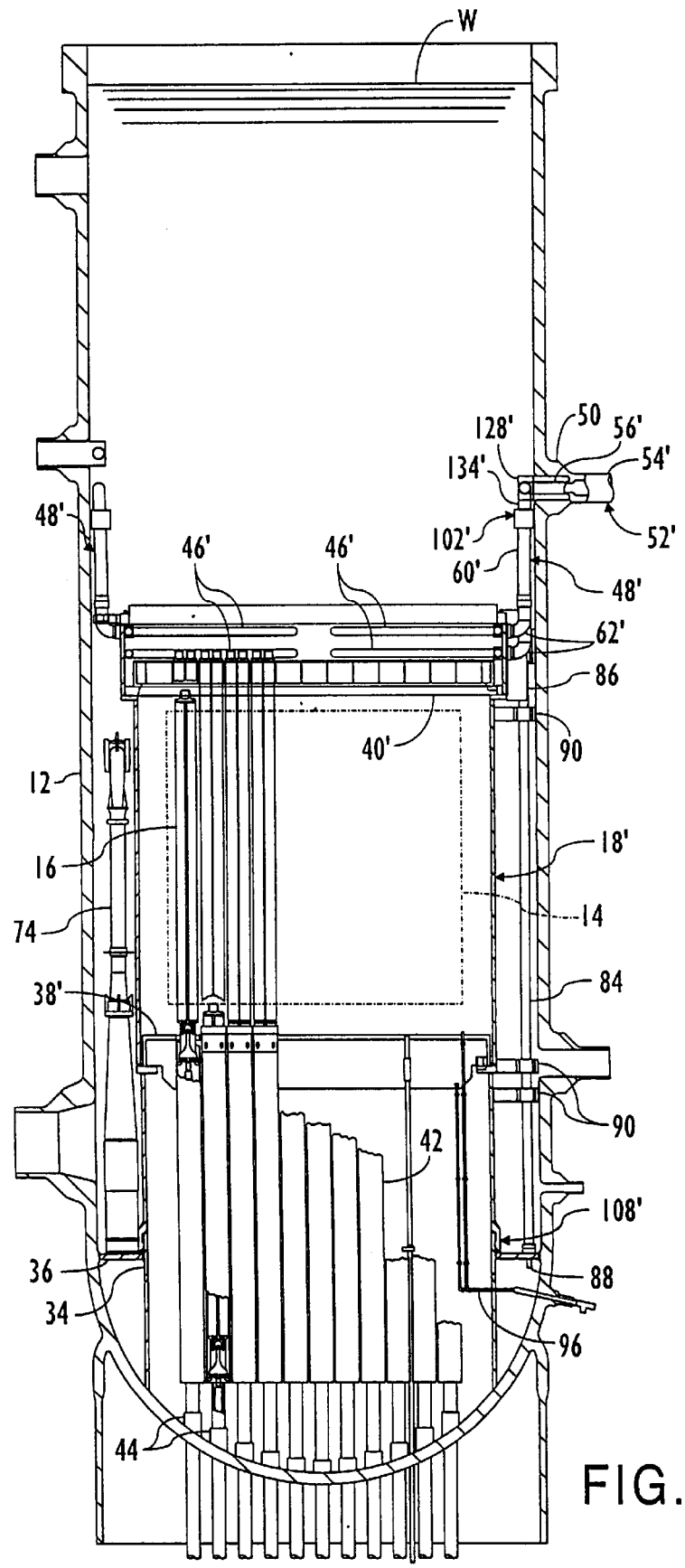
FIG. 19 is a side view, partly in section, of a boiling water reactor assembly illustrating installation of the tie rods, guide tubes and fuel assemblies.
Figure 20:
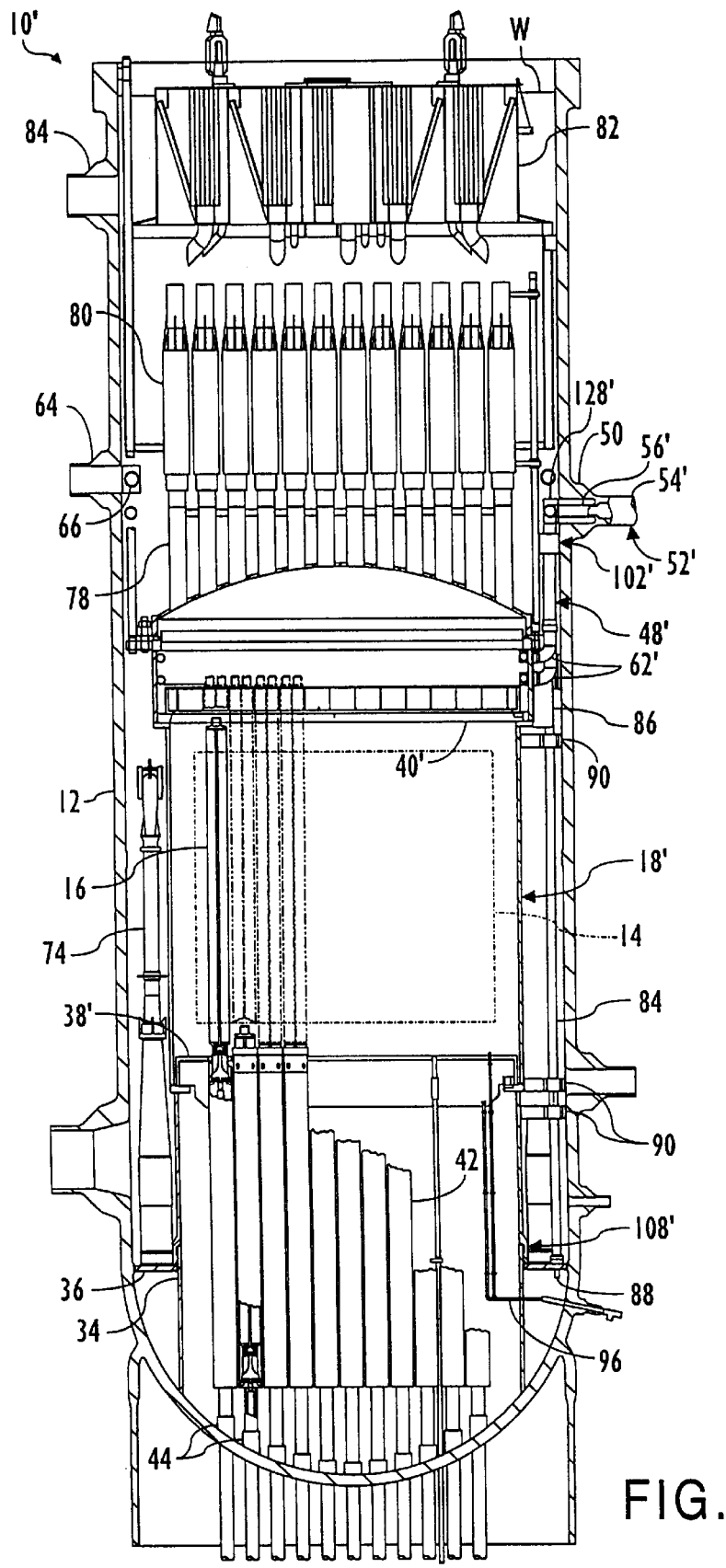
FIG. 20 is a side view, partly in section, of a boiling water reactor assembly illustrating reinstallation of the shroud head, steam separator and dryer assemblies.

Following check out and verification of proper shroud alignment and core spray piping fit-up, the tie rod/radial support assemblies are re-installed as shown in FIG. 19, for example using the method described in U.S. Pat. No. 5,402, 570, and the guide tubes 42 and fuel assemblies 16 are reinstalled in the conventional manner. Once the fuel, shroud head 28, steam separators 80 and dryers 82 have been reassembled, as shown in FIG. 20, the reactor can be returned to power operation.

From the above, it will be appreciated that the core shroud replacement method according to the present invention permits portions of an existing core shroud assembly susceptible to cracking to be removed and replaced with a replacement core shroud assembly formed without welds or formed using improved welding and processing techniques that minimize the potential for cracking. The replacement shroud assembly can be secured to existing support structures using mechanical joints or couplings with interlocking or cooperatively mating features and tie-rods previously installed as part of a core shroud repair or specifically installed as part of the core shroud replacement so that welding of the replacement shroud assembly to existing support structures is not required, thereby minimizing reactor down time and obviating the need for frequent inspections.

The components of the replacement safe end assemblies and the replacement shroud assembly, including the shroud, upper and lower core supports, core spray spargers and core spray supply piping, can be formed of the same materials as the parts they replace or of different materials, if desired.

The mechanical coupling at the lower end or bottom portion of the replacement core shroud assembly can have any configuration to engage supporting structure in the reactor vessel to vertically support the shroud and prevent lateral movement of the shroud relative to the supporting structure, and the coupling can be integrally formed with the replacement shroud as a one-piece unit or formed separately of the replacement shroud and attached thereto or to the supporting structure in any suitable manner such as by welding or by use of mechanical fasteners. The portion of the coupling engaging the supporting structure can, for example, be a cylindrical skirt as shown, a plurality of angularly spaced legs, or any other type of structure having a configuration to cooperatively mate with one or more surfaces, openings or protrusions of the supporting structure to withstand horizontal shear loads. If the coupling includes a cylindrical skirt, the skirt can for example be disposed in or around the remnants of a shroud support cylinder, or a pair of radially spaced concentric skirts can be provided for placement on opposite sides of the shroud support cylinder. In addition, the skirt can be formed with cut-outs, slots or recesses to provide clearance for reactor internals such as, for example, jet pump assemblies. The replacement shroud can be positioned on any supporting structure in the reactor vessel including, but not limited to, the shroud support cylinder, the baffle plate and/or core shroud remnants. In most instances the replacement shroud is positioned on existing supporting structure, although new structure may be added or existing structure modified as required. A seal can be formed at any location between the replacement shroud and the supporting structure. For example, a seal can be formed between the radial step of the coupling and the top of the shroud support cylinder as shown and/or between the portion of the coupling extending downwardly from the radial step and the baffle plate. Components such as, for example, shims, pads and adjustment screws, can be placed between the coupling and the supporting structure to provide vertical, radial and/or tilt adjustments for the shroud assembly, and the coupling can be mechanically keyed to resist torsional misalignment.

The fit-up piece shown along the vertical run of core spray supply piping can have any configuration to mechanically couple with a safe end assembly including, but not limited to, the configuration shown as well as other tubular configurations where the fit-up piece fits telescopically in or around piping to be joined. The fit-up piece is preferably somewhat compliant or flexible to accommodate rotational and axial fit-up tolerances and differential motions between the shroud and the vessel. For example, the fit-up piece could be configured like a bellows and made to surround the piping to be joined. A seal such as, for example, an O-ring or face seal, can be incorporated into the fit-up piece to keep core spray leakage to an acceptable level, and it will be appreciated that the junction box or thermal sleeve attachment inside the reactor vessel can be turned upwardly so that a downwardly turned fit-up piece can mate therewith as the shroud assembly is lowered into the reactor vessel. The fit-up piece can be disposed at any elevation along the length of the core spray supply piping and, if desired, the core spray supply piping can extend directly to a male or female fitting at the inboard end of the safe end assembly without a fit-up piece (i.e., so that the male or female fitting serves as the fit-up piece). Any combination of curved, straight and branched piping can be used to connect the core spray spargers of the replacement shroud assembly with the safe end assemblies installed at the core spray nozzles.

When removing the existing core spray supply piping from the reactor vessel, the thermal sleeve can be cut at any location between the core spray nozzle and the shroud. If necessary, the core spray supply piping can be cut into multiple pieces for removal from the reactor vessel.

The replacement safe end assemblies preferably have thermal sleeves that extend inwardly through the core spray nozzles to mechanically couple with the core spray supply piping inside the reactor vessel. The inner or inboard ends of such thermal sleeves can terminate at male or female fittings having any configuration to mate with cooperatively formed fittings at the upper end of the core spray piping. For example, the thermal sleeves can be formed with male protuberances and the core spray supply piping with female junction boxes or vice versa. While spherical ball joints and cylindrical bayonet mounts are shown, it will be appreciated that any reasonably leak-tight mechanical coupling can be used.

The reactor vessel, shroud structure, core spray spargers and supply piping shown are merely exemplary, and it will be appreciated that the configuration of the reactor vessel, safe end assemblies and core shroud assembly will depend upon the design of the particular reactor being repaired.

It will also be appreciated that as part of the core shroud replacement, it is possible to minimize the number of circumferential welds between cylindrical shell sections in the replacement shroud by replacing these welds with mechanical joints with interlocking features, for example the stepped joint or coupling described above, which provide alignment, sealing and the capability to carry horizontal shear loads. The tie rods and/or radial spacers would then be used to provide lateral support and vertical hold down. This alternative eliminates welds which cause heat-affected regions that can be susceptible to intergranular stress corrosion cracking (IGSCC) especially if it is not practical to solution anneal the circumferential welds. It also eliminates the need to inspect these welds for IGSCC in the future. It may also facilitate handling, storing and shielding these components if they are removed from the reactor after operation.

The shroud replacement method can be modified to replace any portion of the shroud such as, for example, the top portion or segment of the shroud above the top guide including the core spray sparger assemblies and associated inlet or supply piping. Such a repair may be needed if cracks are observed in the core spray spargers and/or piping, thereby necessitating their replacement. In one embodiment, a 360° severance cut is made in the shroud section containing the core spray spargers, and a new shroud section or assembly with new spargers and piping is installed and retained using a mechanical joint or coupling at the location of the 360° cut and tie rods in the same manner as described above. Portions of the existing shroud below the cut serve as the supporting structure for the replacement shroud portion. As in the total shroud replacement approach, the core spray supply piping and thermal sleeve assemblies of the partial shroud replacement can include mechanical joints or junction boxes which form part of the 90° elbows attached to the nozzle thermal sleeve ends and to the outer diameter of the shroud, and a mechanical fit-up piece (e.g., in the form of a telescoping joint) would preferably be provided in the downcomer portion or vertical run of piping. Such a fit-up piece or joint will provide limited rotational flexibility at the elbows and vertical compliance to assure ease of fit-up during installation and to accommodate differential motions between the reactor vessel and shroud during operation.

The procedural steps of the foregoing core shroud replacement method can be performed in any order dependent upon reactor design and the configuration of the replacement core shroud and safe end assemblies.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A replacement core shroud assembly for a boiling water reactor having a reactor vessel and supporting structure with a cylindrical portion disposed within the reactor vessel, said replacement core shroud assembly comprising at least a portion of a core shroud having top and bottom portions, said bottom portion having a configuration to mate cooperatively with the cylindrical portion of the supporting structure in telescoping relation to limit lateral movement of said replacement core shroud assembly relative to the reactor vessel; and a plurality of tie rods secured between sites on said core shroud and the supporting structure at a respective plurality of angularly spaced locations about the periphery of said core shroud to apply axially compressive forces along substantially all of the shroud length in the direction of the supporting structure.

2. A replacement core shroud assembly as recited in claim 1 wherein said bottom portion of said replacement core shroud assembly includes a coupling having a stepped portion terminating in a cylindrical rim of greater diameter than the cylindrical portion of the supporting structure to telescopically receive the cylindrical portion of the supporting structure therein.

3. A replacement core shroud assembly as recited in claim 2 and further comprising a seal configured to fit between said coupling and the supporting structure.

4. A replacement core shroud assembly as recited in claim 1 and further comprising a core spray sparger disposed within said replacement core shroud and core spray supply piping extending from said core spray sparger for connection with a safe end assembly disposed at a core spray nozzle formed in the reactor vessel.

5. In combination, a replacement core shroud assembly as recited in claim 4 and a replacement safe end assembly for attachment to a core spray nozzle formed in the reactor vessel, said replacement safe end assembly comprising a thermal sleeve adapted to fit within the core spray nozzle and having an open end mechanically coupled with said core spray supply piping to permit rotation of said piping about at least one axis.

6. A combination as recited in claim 5 wherein a portion of said core spray supply piping includes a fit-up piece providing rotational and axial adjustability when connecting said core spray supply piping with said replacement safe end assembly.

7. A replacement core shroud assembly as recited in claim 5 wherein said thermal sleeve terminates at a hollow, male connector having an opening formed therein and said core spray supply piping terminates at a hollow, female receptacle configured to receive said hollow, male connector in sealing relation.

8. A replacement core shroud assembly as recited in claim 7 wherein said connector and said receptacle are generally spherical to define a ball joint.

9. A replacement core shroud assembly as recited in claim 7 wherein said connector and said receptacle are generally cylindrical.

10. A replacement core shroud assembly as recited in claim 7 wherein said female receptacle includes at least a pair of mating portions disposed on opposite sides of said male connector and fastening means for holding said mating portions together.

11. A replacement core shroud assembly as recited in claim 2 wherein the supporting structure includes a plate extending transversely between the reactor vessel and the cylindrical portion of the supporting structure, and wherein said cylindrical rim has an axial length such that, when said rim is rested upon the plate, said stepped portion of said coupling will be disposed above an upper edge of the cylindrical portion of the supporting structure.

12. A replacement core shroud assembly as recited in claim 11 and further comprising a seal for positioning between said stepped portion of said coupling and the upper edge of the cylindrical portion of the supporting structure.

13. A replacement core shroud assembly as recited in claim 11 wherein a lower inner edge of said cylindrical rim is chamfered.

14. A replacement core shroud assembly as recited in claim 2 and further comprising adjustment means extending from said coupling toward the cylindrical portion of the supporting structure for adjusting the position of the replacement core shroud relative to the supporting structure and the reactor vessel.

* * * * *